Patented Apr. 23, 1940

2,198,538

UNITED STATES PATENT OFFICE 2,198,538

PROCESS FOR MANUFACTURING ARTIFICIAL FIBER FROM PROTEIN CONTAINED IN SOYBEAN

Toshiji Kajita and Ryohei Inoue, Tokyo, Japan, assignors, by mesne assignments, to Showa Sangyo Kabushiki Kaisha, Yokohama, Japan, a body corporate of Japan No Drawing. Application September 8, 1937, Serial No. 162,954. In Japan May 25, 1937

2 Claims. (Cl. 18—54)

This invention relates to a process of manufacturing artificial fiber from protein contained in soybean, and consists in extracting the protein, with dilute alkaline solution, from the residue of the soybean after the oil content has been extracted. The protein is then precipitated by adding acids or metallic salts to said solution. The precipitate is washed with water, allowing a suitable amount of water to remain with the precipitate. A stabilizer such as sugar or tartaric acid is added thereto and then the mixture is dissolved in alkaline solution. The resulting solution is then allowed to mature after which the solution thus obtained is spun into an acid bath which may contain suitable organic coagulating agents. The object of this invention is to produce artificial fiber of a superior quality which does not degenerate and to provide an economical and efficient process of manufacturing such fibers.

The advantages of our invention may be more fully understood from the following description. In the present invention a stabilizer such as sugar or tartaric acid is added to the precipitate obtained from the extraction solution above described and the mixture is then dissolved in alkaline solution, the resulting solution being allowed to mature and the solution thus obtained is spun into an acid bath which may contain suitable organic coagulating agents. By the addition of the stabilizer such as herein mentioned, the oxidation or decomposition of protein can be prevented during the process, especially during the step of maturing. Moreover, while the spinning solution is maturing, a homogeneous solution is obtained and the spinning can be easily carried on. The resulting fiber does not degenerate and a very pliant touch as well as an excellent dieing ability is obtained. In manufacturing a fiber from a spinning solution prepared by dissolving the protein of the soybean in alkaline solution to which sugar or tartaric acid have not been added and which is not submitted to maturing, the protein is oxidised and decomposed during the process and consequently the filament is broken during the spinning step and continuous spinning cannot therefore be carried on. Moreover, the fiber thus obtained is very hard and brittle and consequently of no practical use.

One example of carrying out the invention into practice is as follows:

The residue of soybean from which the oil content has been extracted and containing 40 to 47% of protein is subjected to extraction with an alkaline solution diluted 5 to 10 times by weight, for example, 0.2 to 2% of ammonia solution or caustic alkaline solution at the temperature of 20° to 30° C., for about 2 to 5 hours, whereby the protein amounting to 10 to 20% of the total amount of the raw material may be extracted. The protein thus obtained is purified by adding a dilute solution of hydrogen peroxide or sodium peroxide and bone charcoal or China clay and then filtered. To the transparent solution thus obtained a solution containing 10 to 15% of acids such as acetic acid, sulphuric acid, phosphoric acid, etc., or a 30 to 40% aqueous solution of metallic salts of acids, for example, copper sulphate, zinc sulphate, zinc acetate, copper acetate is added and until the solution becomes weakly acidic, whereby the protein or proteic salt is precipitated. The precipitate thus obtained is thoroughly washed with water to remove adhering salts and acids and separated by filtering. Then sugar or tartaric acid is added as a stabilizer at the rate of 0.2 to 0.5% to said precipitate which contains 75 to 85% of water and subsequently said mixture is well mixed and kneaded in an alkaline solution of 25 to 40% concentration which corresponds to 3 to 7% of the protein content whereby a colloidal solution is produced. Then by filtering and removing bubbles, and maturing the said solution at the temperature of 10° to 20° C. for 2 to 3 days, a spinning solution is obtained. This spinning solution is then spun in the usual manner or allowed to fall into an acid bath of 10 to 50% concentration or an acid bath containing in addition 10 to 20% of an organic coagulating agent such as alcohol, formaldehyde, acetone, etc., and then submitted to the finishing procedure.

According to the present invention, a proteic artificial fiber of superior quality resembling wool or natural silk which does not degenerate can be obtained.

What we claim is:

1. The process of manufacturing artificial fiber from protein contained in the soybean, consisting in extracting the protein with dilute alkaline solution from the residue of the soybean from which the oil content has been extracted, precipitating the protein by adding an acid to said solution, washing said precipitate with water, adding sugar while the precipitate is wet, dissolving the said mixture in an alkaline solution, permitting the resulting solution to mature, spinning the solution thus obtained into an acid bath.

2. The process of manufacturing artificial fiber from protein contained in the soybean, consisting in extracting the protein with dilute alkaline solution from the residue of the soybean from which the oil content has been extracted, precipitating the protein by adding an acid to said solution, washing said precipitate with water, adding sugar while the precipitate is wet, dissolving the said mixture in an alkaline solution permitting the resulting solution to mature, spinning the solution thus obtained into an acid bath, containing organic coagulating agents.

TOSHIJI KAJITA.
RYOHEI INOUE.